(12) United States Patent
Okot

(10) Patent No.: US 8,209,822 B2
(45) Date of Patent: Jul. 3, 2012

(54) DRAW CORD ADJUSTER

(75) Inventor: Alex W. Okot, Amsterdam (NL)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 13/041,748

(22) Filed: Mar. 7, 2011

(65) Prior Publication Data

US 2011/0154625 A1    Jun. 30, 2011

Related U.S. Application Data

(62) Division of application No. 11/554,073, filed on Oct. 30, 2006, now Pat. No. 7,921,522.

(51) Int. Cl.
*A41D 3/00* (2006.01)
*A42B 1/00* (2006.01)

(52) U.S. Cl. .................. 24/115 G; 2/84; 2/202; 2/171.6

(58) Field of Classification Search ........................ None
See application file for complete search history.

(56) References Cited

U.S. PATENT DOCUMENTS

| 2,084,720 | A | * | 6/1937 | Alexandre | 2/237 |
|---|---|---|---|---|---|
| 4,719,710 | A | | 1/1988 | Pozzobon et al. | |
| 5,615,416 | A | * | 4/1997 | Haddad | 2/202 |
| 5,934,599 | A | | 8/1999 | Hammerslag et al. | |
| 6,126,237 | A | | 10/2000 | Ritterhouse | |
| 2003/0204970 | A1 | | 11/2003 | Liu | |
| 2006/0196022 | A1 | | 9/2006 | Okot | |

* cited by examiner

*Primary Examiner* — Jack W. Lavinder
(74) *Attorney, Agent, or Firm* — Banner & Witcoff, Ltd.

(57) ABSTRACT

A draw cord adjuster includes a closure member having a first end and a second end. At least one locking member is anchored to one of the first end and the second end of the closure member. At least one anchoring member is positioned proximate the one of the first end and the second end of the closure member to which a corresponding locking member is anchored, with each anchoring member being movably secured to the corresponding locking member.

13 Claims, 5 Drawing Sheets

DRAW CORD ADJUSTER

RELATED APPLICATIONS

This application is a divisional of U.S. Ser. No. 11/554,073, filed Oct. 30, 2006, which is entirely incorporated herein by reference.

FIELD OF THE INVENTION

This invention relates generally to a draw cord adjuster, and, in particular, to a concealed draw cord adjuster.

BACKGROUND OF THE INVENTION

Articles of apparel, luggage, backpacks, sporting equipment and other items often use closure assemblies, such as drawstrings, straps, cords, etc., to close, tighten or otherwise adjust an opening or other portion of the article. For example, hooded coats and sweatshirts often incorporate a drawstring to tighten the hood about the user's face and head. When drawstrings are used on a hood of a coat or jacket, for example, the hanging drawstring can be cumbersome and an annoyance, and may create a safety issue due to the drawstring getting caught in or on another object. This can be especially dangerous for children. Other applications for such drawstrings include pockets, often found on backpacks or luggage, for example. A draw cord adjuster may be used in certain applications to facilitate tightening and loosening the drawstring, thereby adjusting the opening or other portion of the article.

It would be desirable to provide a draw cord adjuster that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a draw cord adjuster with an improved configuration. In accordance with a first aspect, a draw cord adjuster includes a closure member having a first end and a second end. At least one locking member is anchored to one of the first end and the second end of the closure member. At least one anchoring member is positioned proximate the one of the first end and the second end of the closure member to which a corresponding locking member is anchored, with each anchoring member being movably secured to the corresponding locking member.

In accordance with another aspect, a draw cord adjuster includes a drawstring having a first end and a second end. A first cord lock has a first aperture extending therethrough and a pair of second apertures. A first end of the drawstring extends through the first aperture. A second cord lock has a first aperture extending therethrough and a pair of second apertures. A second end of the drawstring extends through the first aperture. A first anchoring member includes a substantially U-shaped cord defining two legs, with each leg extending through one of the second apertures of the first cord lock. A second anchoring member includes a substantially U-shaped cord defining two legs, with each leg extending through one of the second apertures of the second cord lock.

In accordance with a further aspect, a draw cord adjuster assembly includes an object having an opening formed therein. A channel is formed about a periphery of the opening. A closure member has a first end and a second end and extends through the channel. A locking member is anchored to the first end of the closure member. An anchoring member is positioned proximate the first end of the closure member and is secured to the object, with the locking member being movably secured to the anchoring member.

In accordance with yet a further aspect, a draw cord adjuster assembly includes an object having a channel formed therein. A drawstring extends through the channel and has a first end and a second end. A cord lock has a first aperture extending therethrough and a pair of second apertures extending therethrough, with the drawstring extending through the first aperture. An anchoring member includes a substantially U-shaped cord defining two legs, with each leg extending through one of the second apertures of the cord lock.

Substantial advantage is achieved by providing a draw cord adjuster. In particular, certain embodiments of the draw cord adjuster allow an object to be tightened or loosened, without the hazard of an exposed draw cord.

These and additional features and advantages disclosed here will be further understood from the following detailed disclosure of certain embodiments.

Figure 1:
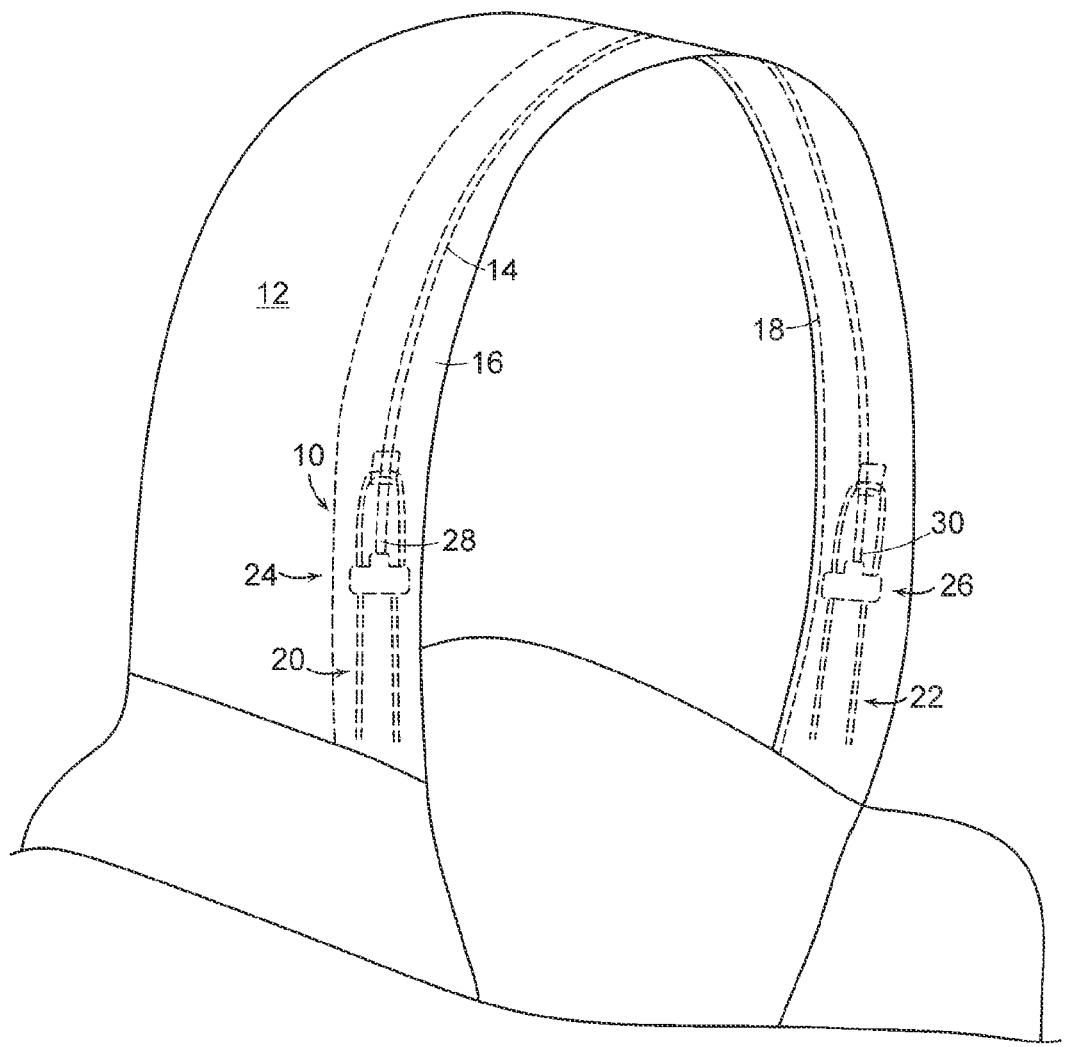
FIG. 1 is a perspective view of an article of apparel with a pair of draw cord adjusters.

The figures referred to above are not drawn necessarily to scale and should be understood to provide a representation of the invention, illustrative of the principles involved. Some features of the draw cord adjuster depicted in the drawings have been enlarged or distorted relative to others to facilitate explanation and understanding. The same reference numbers are used in the drawings for similar or identical components and features shown in various alternative embodiments. Draw cord adjusters as disclosed herein would have configurations and components determined, in part, by the intended application and environment in which they are used.

DETAILED DESCRIPTION OF CERTAIN PREFERRED EMBODIMENTS

Figure 2:
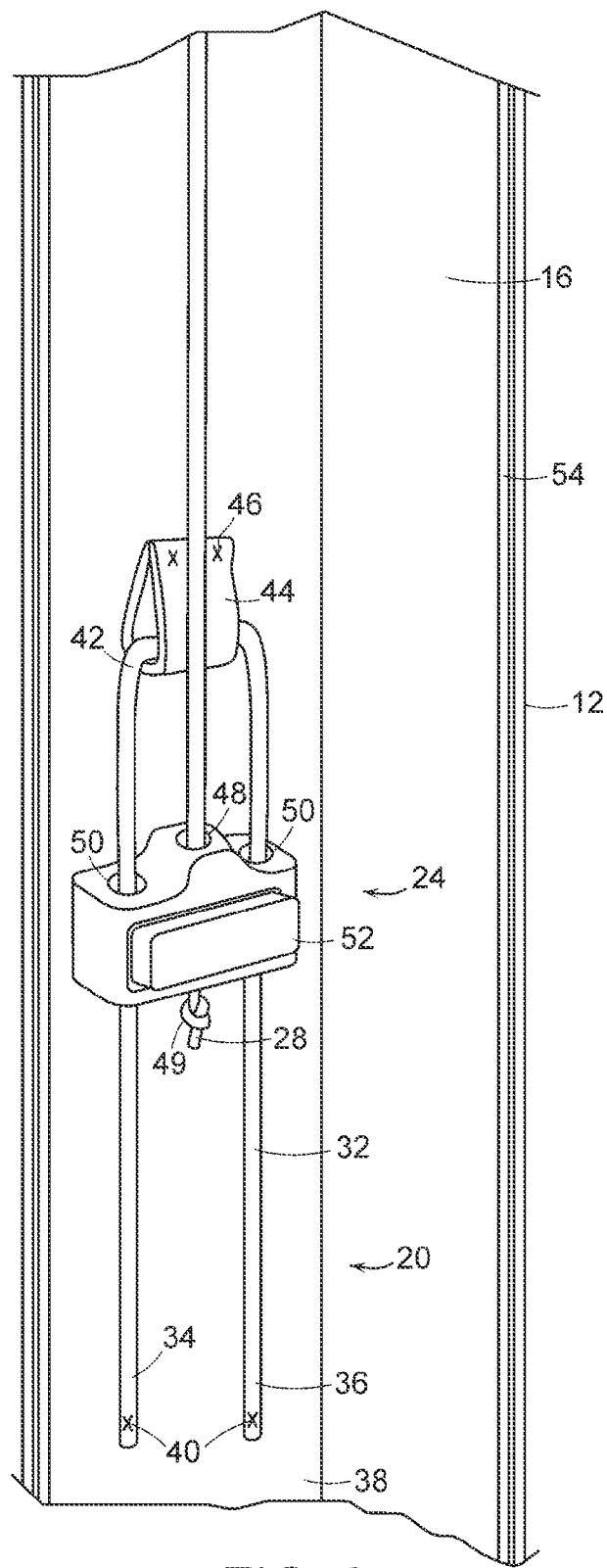
FIG. 2 is a perspective view of a draw cord adjuster of FIG. 1.
Figure 7:
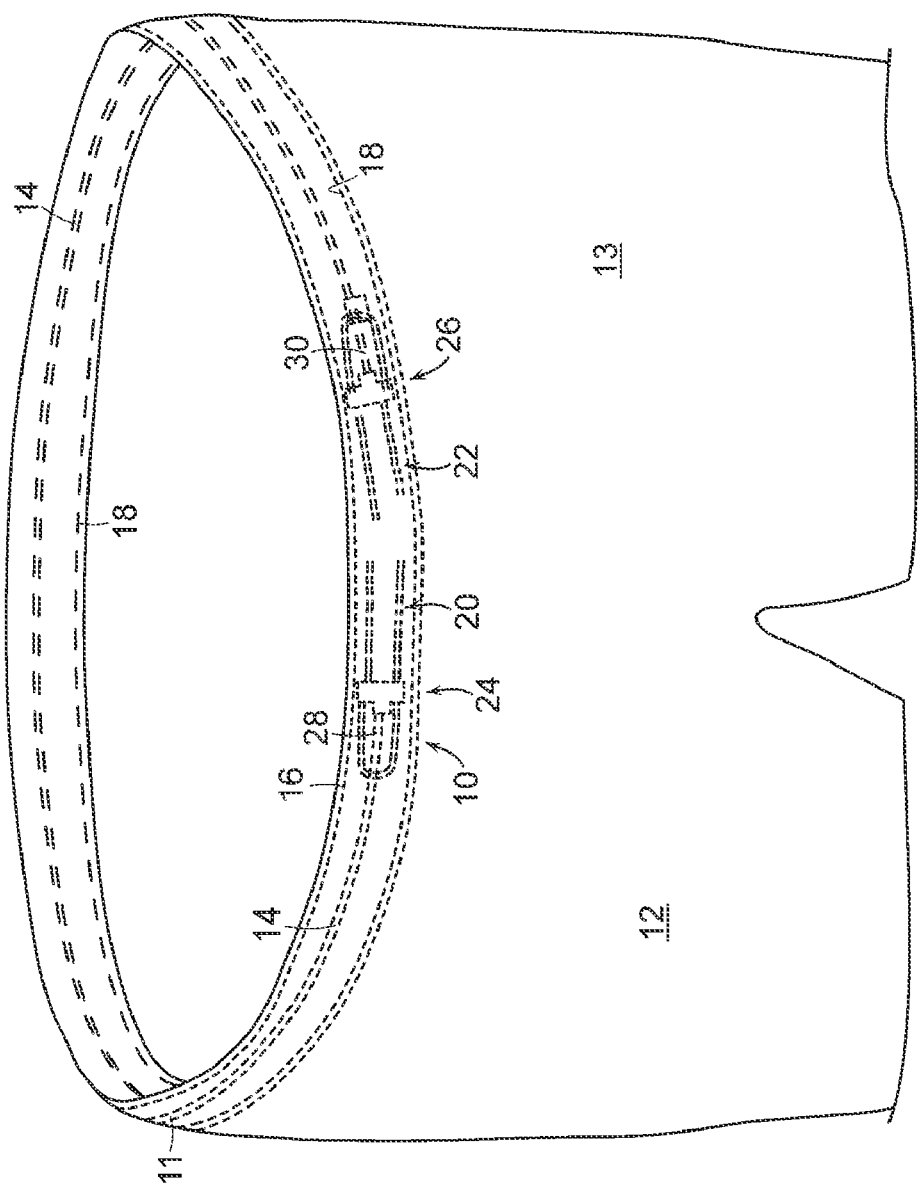
FIG. 7 is perspective view of another article of apparel with a pair of draw cord adjusters.

The present invention may be embodied in various forms. A preferred embodiment of a draw cord adjuster 10 is shown in FIGS. 1-2. As seen here, draw cord adjuster 10 can be seen in use on a hood 12 of an article of apparel such as a jacket or sweatshirt. It is to be appreciated that draw cord adjusters 10 can be used as adjustment members or closures, for other elements, such as pockets, on a variety of objects including, without limitation, for example, other articles of apparel such as footwear, backpacks, knapsacks, duffle bags and other bags. In another embodiment, shown in FIG. 7, draw cord adjuster 10 can be seen in use on the waistline 11 of a pair of pants 13. It is to be appreciated that the discussion of draw cord adjusters 10 below with respect to FIGS. 1-2 is applicable to the embodiment illustrated in FIG. 7 as well. Accordingly, FIG. 7 itself will not be discussed in any greater detail herein. Other suitable applications for draw cord adjuster 10 will become readily apparent to those skilled in the art, given the benefit of this disclosure.

In the embodiment illustrated in FIGS. 1-2, draw cord adjusters 10 are secured to opposed ends of a closure member, such as a drawstring 14, that is captured within a channel 16 formed in hood 12. By moving draw cord adjusters 10 up and down along hood 12, drawstring 14 can alternately be cinched or loosened, thereby alternately tightening and loosening hood 12 about the head of the user. Channel 16 serves to keep drawstring 14 concealed within hood 12, reducing the chances of drawstring 14 getting caught in or on another object, thereby improving the safety of the user. Channel 16 may be formed by folding over an edge of hood 12 and securing it with stitching 18, for example, in other embodiments, channel 16 could be formed by securing a separate piece of material to hood 12 along opposed edges thereof by stitching, for example.

Draw cord adjuster 10, includes a first anchoring member 20 and a second anchoring member 22. First anchoring member 20 is secured to the left side of hood 12 and second anchoring member 22 is secured to the right side of hood 12. A first locking member 24 is movably secured to first anchoring member 20, and a second locking member 26 is movably secured to second anchoring member 20. A first end 28 of drawstring 14 is retained by first locking member 24 and an opposed second end 30 of drawstring 14 is retained by second locking member 26.

First anchoring member 20 and first locking member 24 are illustrated more clearly in FIG. 2. It is to be appreciated that second anchoring member 22 and second locking member 26 have the same configuration as first anchoring member 20 and first locking member 24, respectively, and, therefore, need not be shown in greater detail.

In the illustrated embodiment, first anchoring member 20 is formed of a substantially U-shaped cord 32 defining a first leg 34 and a second leg 36, with ends of first and second legs 34, 36 being secured to hood 12 at a first end 38 of channel 16 by stitching 40 or any other suitable fastening means. In certain embodiments, cord 32 may be an elastic cord. A closed end 42 of U-shaped cord 32 is secured to hood 12. In the illustrated embodiment a retaining member 44 formed of a loop of material is secured to hood 12, with closed end 42 passing through retaining member 44, thereby securing cord 32 to hood 12. Retaining member 44 may be formed of fabric as illustrated here, which is secured to hood 12 with stitching 46 or any other suitable fastening means. In other embodiments, retaining member 44 could be a cord or strap, for example.

In the illustrated embodiment, a first aperture 48 extends through a central portion of first locking member. First end 28 of drawstring 14 extends through first aperture 48 and a first knot 49 is formed on first end 28 such that drawstring 14 is retained by first locking member 24. It is to be understood that a second knot is formed on second end 30 of drawstring 14, thereby retaining drawstring 14 with second locking member 26.

A pair of second apertures 50 is formed in first locking member 24, with first leg 34 of first anchoring member 20 extending through one second aperture 50 and second leg 36 of first anchoring member 20 extending through the other second aperture 50. When a push-button 52 on first locking member 24 is depressed, cord 32 alternates between an engaged (or locked) position and a disengaged (or unlocked) position.

To operate draw cord adjuster 10, the user moves either or both of first and second locking members 24, 26 upwardly and downwardly within channel 16, thereby tightening and loosening drawstring 14. With draw cord adjuster concealed within channel 16, the user simply finds first and second locking members 24, 26 by touch and grasps them between their fingers to operate pushbuttons 52.

For example, first and second locking members 24, 26 can be moved downward within channel 16 when they are in a non-locked or disengaged condition, thereby drawing first end 28 of drawstring 14 downwardly, thereby tightening hood 12 about the user's head.

In certain embodiments, a layer of material 54 may be positioned on the interior of channel 16 to facilitate movement of first and second locking members 24, 26 therein. In certain embodiments, material 54 may be coated with polytetrafluoroethylene (PTFE). Other suitable materials that will enhance the movement of first and second locking members 24, 26 within channel 16 will become readily apparent to those skilled in the art, given the benefit of this disclosure.

Figure 3:
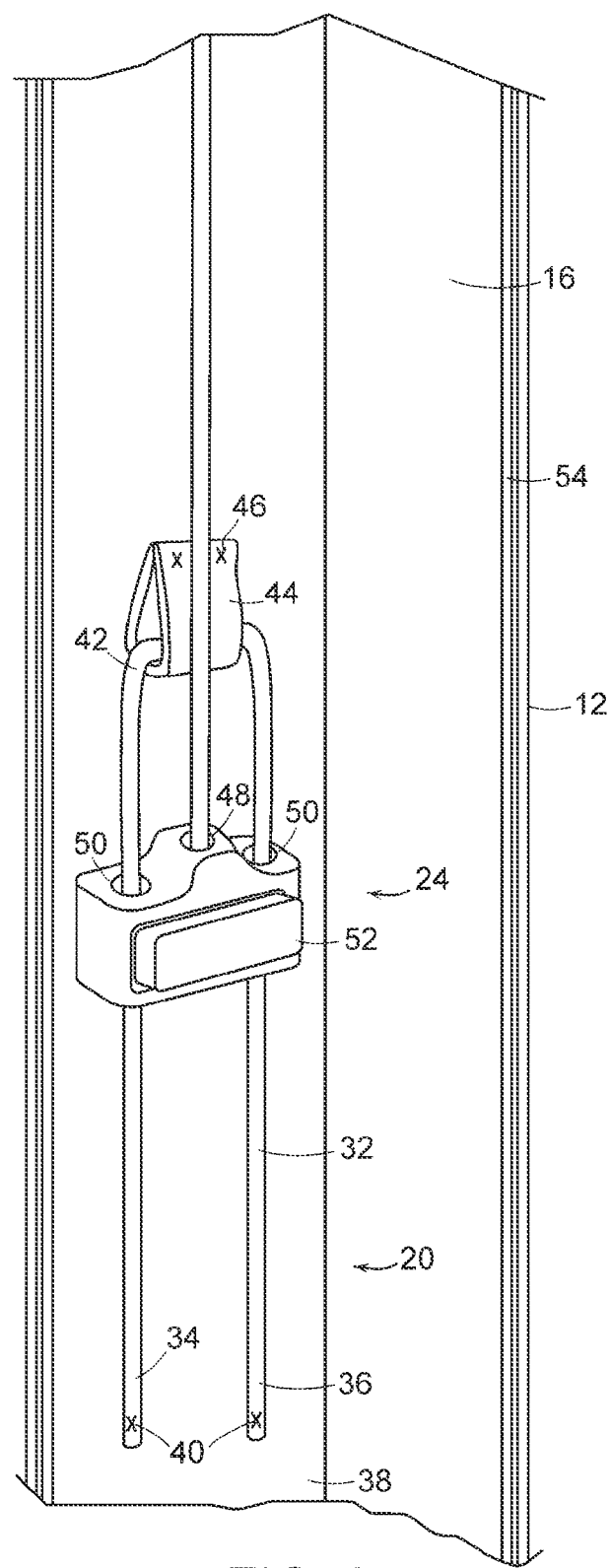
FIG. 3 is a perspective view of an alternative embodiment of the draw cord adjuster of FIG. 1.

In certain embodiments, as illustrated in FIG. 3, first knot 49 on first end 28 of drawstring 14 is positioned within first locking member 24 beneath first aperture 48. Similarly, the second knot on second end 30 of drawstring 14 is positioned within with second locking member 26.

Figure 4:
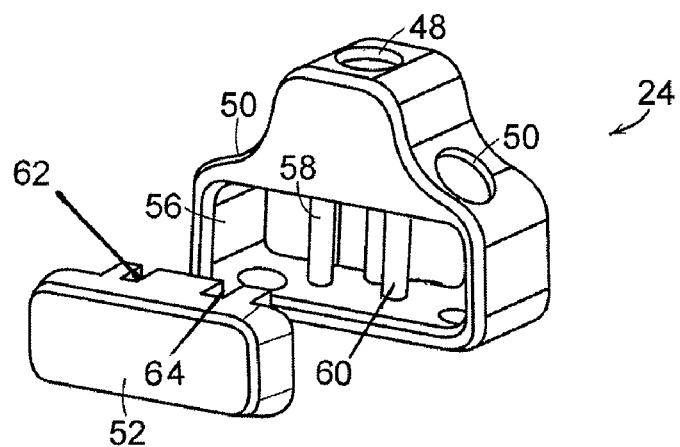
FIG. 4 is a perspective view, in exploded form, of an embodiment of the cord lock of FIG. 2.
Figure 5:
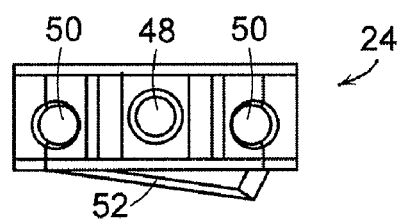
FIG. 5 is a plan view of the cord lock of FIG. 4, shown in a closed or locked condition.
Figure 6:
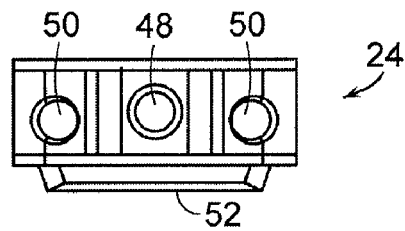
FIG. 6 is a plan view of the cord lock of FIG. 4, shown in an open or unlocked condition.

In certain embodiments, the cord locks of first and second locking members 24, 26 are toggle operated locks. As seen in FIGS. 4-6, with respect to first locking member 24, push button 52 is seated in a recess 56 formed in first locking member 24. A first pin 58 and a second pin 60 are seated within recess 56, each extending substantially parallel to an axis of first aperture 48 and second apertures 50. A first groove 62 and a second groove 64 are formed on an inner surface of push button 52, with first groove 62 receiving first pin 58 and second groove 64 receiving second pin 60.

Push button 52 operates by toggling about between the locked, or closed, position seen in FIG. 5, and the unlocked, or open, position seen in FIG. 6. When one side of push button 52 is depressed, it moves into its locked condition, impinging on first leg 34 or second leg 36 of cord 32, thereby anchoring first locking member 24 to cord 32. To release first locking member 24, the opposite side of push button 52 is depressed, returning push button 52 to its neutral unlocked position, thereby allowing first locking member 24 to move freely along cord 32.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

What is claimed is:

1. A draw cord adjuster assembly comprising, in combination:

an object having an opening formed therein;
a channel formed about a periphery of the opening;
a closure member extending through the channel and having a first end and a second end, the closure member being concealed within the channel such that is not visible from an exterior of the channel;
a locking member anchored to the first end of the closure member, including a first aperture extending therethrough, and a pair of second apertures extending therethrough, the closure member extending through the first aperture; and an anchoring member positioned proximate the first end of the closure member and secured to the object, the locking member movably secured to the anchoring member.

2. The draw cord adjuster assembly of claim 1, wherein the object is the hood of an article of apparel.

3. The draw cord adjuster assembly of claim 2, wherein the channel is formed by folding over an edge of the hood.

4. The draw cord adjuster assembly of claim 1, wherein the anchoring member is secured to the object with stitching.

5. The draw cord adjuster assembly of claim 1, wherein the closure member comprises a drawstring.

6. The draw cord adjuster assembly of claim 1, wherein the anchoring member comprises a substantially U-shaped cord defining two legs, each leg extending through one of the second apertures of the first cord lock.

7. The draw cord adjuster assembly of claim 1, wherein the closure member comprises a cord, a first knot being formed on a first end of the cord to anchor the first end of the cord to the locking member.

8. The draw cord adjuster assembly of claim 1, wherein the locking member comprises a pushbutton operated toggle lock.

9. The draw cord adjuster assembly of claim 1, wherein the closure member and the anchoring member each comprise an elastic cord.

10. A draw cord adjuster assembly comprising:
an object having an opening formed therein;
a channel formed about a periphery of the opening;
a layer of material positioned on an interior surface of the channel;
a closure member extending through the channel and having a first end and a second end, the closure member being concealed within the channel such that is not visible from an exterior of the channel;
a locking member anchored to the first end of the closure member; and
an anchoring member positioned proximate the first end of the closure member and secured to the object, the locking member movably secured to the anchoring member.

11. The draw cord adjuster assembly of claim 10, wherein the layer of material is coated with PTFE.

12. A draw cord adjuster assembly comprising, in combination:
an object having a channel formed therein;
a drawstring extending through the channel and having a first end and a second end;
a cord lock having a first aperture extending therethrough and a pair of second apertures extending therethrough, the drawstring extending through the first aperture; and
an anchoring member comprising a substantially U-shaped cord defining two legs, each leg extending through one of the second apertures of the cord lock.

13. The draw cord adjuster of claim 12, wherein the object is the waistline of an article of apparel.

* * * * *